(12) United States Patent
Hiruma et al.

(10) Patent No.: US 12,095,388 B2
(45) Date of Patent: Sep. 17, 2024

(54) POWER CONVERSION SYSTEM

(71) Applicant: DENSO CORPORATION, Kariya (JP)

(72) Inventors: Atsuyuki Hiruma, Kariya (JP); Yuuki Kubo, Kariya (JP)

(73) Assignee: DENSO CORPORATION, Kariya (JP)

( * ) Notice: Subject to any disclaimer, the term of this patent is extended or adjusted under 35 U.S.C. 154(b) by 180 days.

(21) Appl. No.: 17/951,522

(22) Filed: Sep. 23, 2022

(65) Prior Publication Data
US 2023/0014369 A1 Jan. 19, 2023

Related U.S. Application Data

(63) Continuation of application No. PCT/JP2021/010775, filed on Mar. 17, 2021.

(30) Foreign Application Priority Data

Mar. 24, 2020 (JP) .................................. 2020-052421

(51) Int. Cl.
*H02M 1/15* (2006.01)
*H02M 1/00* (2006.01)
(Continued)

(52) U.S. Cl.
CPC ....... *H02M 7/5395* (2013.01); *H02M 1/0009* (2021.05); *H02M 1/14* (2013.01);
(Continued)

(58) Field of Classification Search
CPC .......... H02P 27/08; H02P 21/22; H02M 1/15; H02M 3/24; H02M 7/5395; H02M 1/0009; H02M 1/14; H02M 1/143; H02M 7/53871
(Continued)

(56) References Cited

U.S. PATENT DOCUMENTS

| 5,886,888 A * | 3/1999 | Akamatsu ................ H02M 1/12 363/71 |
| 2013/0002262 A1* | 1/2013 | Tago ..................... B60L 3/0069 324/503 |

(Continued)

FOREIGN PATENT DOCUMENTS

JP 2002-272113 A 9/2002

*Primary Examiner* — Gabriel Agared
(74) *Attorney, Agent, or Firm* — Oliff PLC

(57) ABSTRACT

In a power conversion system, a power converter includes a power conversion circuit connected to a direct current (DC) source via a DC distribution line and converts and supplies received DC power to a load, and a power conversion control unit. A power stabilizing device is disposed between the DC distribution line and the power converter and stabilizes a DC voltage applied from the DC power source. A control power source of the power stabilizing device performs current control of the current transformer to suppress DC magnetization caused by a DC current component of the primary current while compensating for a varying component of the DC voltage. The control power source acquires current information or voltage information calculated from control information used by the power conversion control unit for control operations related to energization of the load and uses it as control information for the power stabilizing device.

6 Claims, 11 Drawing Sheets

(51) Int. Cl.
*H02M 1/14* (2006.01)
*H02M 3/24* (2006.01)
*H02M 7/5395* (2006.01)
*H02P 21/22* (2016.01)
*H02P 27/08* (2006.01)

(52) U.S. Cl.
CPC .............. *H02M 3/24* (2013.01); *H02P 21/22* (2016.02); *H02P 27/08* (2013.01)

(58) Field of Classification Search
USPC .................................................. 318/400.02
See application file for complete search history.

(56) References Cited

U.S. PATENT DOCUMENTS

| | | | |
|---|---|---|---|
| 2013/0057061 A1* | 3/2013 | Shiomi ................... | B60R 16/03 307/9.1 |
| 2013/0264872 A1* | 10/2013 | Tago ..................... | H02M 7/003 307/31 |
| 2018/0241301 A1* | 8/2018 | Nagaoka ............... | B60L 53/122 |
| 2021/0021224 A1* | 1/2021 | Niimura ................. | H02M 7/49 |

* cited by examiner

FIRST AND THIRD EMBODIMENTS

FOURTH EMBODIMENT

POWER CONVERSION SYSTEM

CROSS-REFERENCE TO RELATED APPLICATION

This application is a continuation application of International Application No. PCT/JP2021/010775 filed Mar. 17, 2021 which designated the U.S. and claims priority to Japanese Patent Application No. 2020-052421 filed Mar. 24, 2020, the contents of each of which are incorporated herein by reference.

BACKGROUND

Technical Field

The present disclosure relates to a power conversion system including a power converter and a power stabilizing device.

Related Art

Conventionally, a device is known that is provided between a power source and a load to compensate for a ripple component of a DC voltage of the power source and stabilize the DC voltage. The known DC reactor device includes a DC reactor main winding, a DC reactor auxiliary winding magnetically coupled to the DC reactor main winding via a DC reactor iron core, a voltage source, and control means. The DC reactor main winding is connected between a rectifying circuit that rectifies the AC source and a smoothing capacitor on the load side. The voltage source is connected to the DC reactor auxiliary winding and generates an arbitrary voltage waveform. The control unit controls the voltage source to suppress the magnetic saturation of the DC reactor and compensate for the DC ripple.

DESCRIPTION OF SPECIFIC EMBODIMENTS

Figure 1:
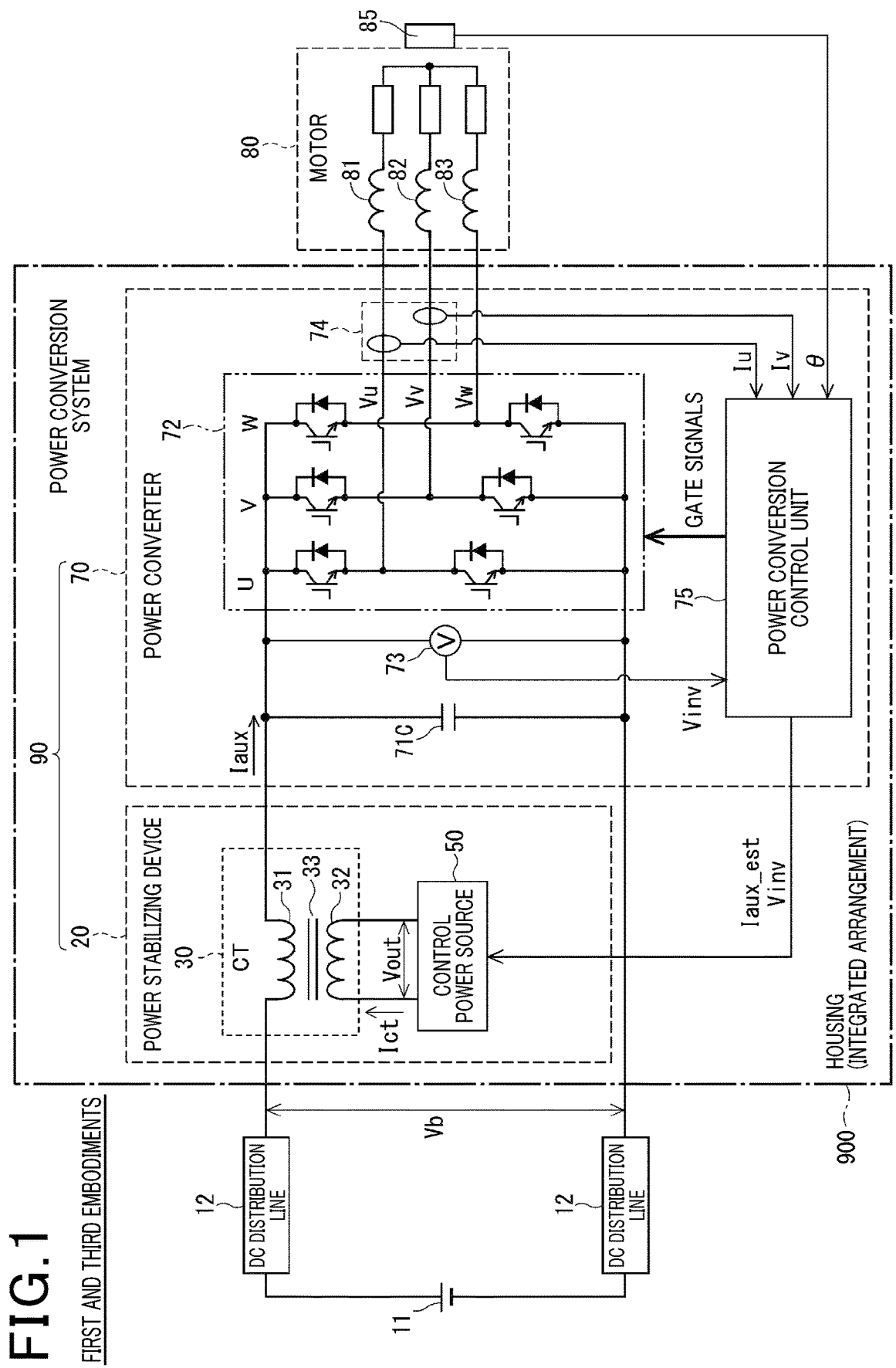
FIG. 1 is an illustration of the overall configuration of a power conversion system according to each of first and third embodiments.

Assuming that a power conversion system supplies a DC voltage to a power converter, such as a polyphase inverter or a DC-DC converter, diode rectification of a three-phase alternating current (AC) power source at the input of the power converter, as in the technique disclosed in JP 2002-272113 A, leads to large direct current (DC) voltage ripples. To smooth ripples and stabilize the DC voltage, an LC filter formed of a DC reactor and a smoothing capacitor is often used.

In a system configuration in which a power converter is connected to a DC power source via a DC distribution line, not limited to a configuration in which the three-phase alternating current is diode rectified, harmonic currents are generated by switching operations of the power converter. These harmonic currents may cause resonance phenomena due to inductance and capacitance components on the DC power source side, which may destabilize the DC power source.

In order to perform control for suppressing the magnetic saturation, the technique disclosed in JP 2002-272113 A includes detecting the DC primary current including ripples using a current sensor (as a "DC primary winding current detection circuit") to thereby control the voltage source of the DC reactor device. However, detection of the DC primary current that is the total current flowing through a load requires a large current sensor capable of detecting large currents, leading to increased system size and weight. Not only providing the current sensor for the primary current, but also providing a voltage sensor in the power stabilizing device to suppress variations in DC voltage input to the power converter can raise the same issues such as an increase in the number of components and larger system size.

In view of the foregoing, it is desired to have a power conversion system that reduces the number of sensors for a power stabilizing device, thereby reducing the number of components and the size of the system.

One aspect of the present disclosure provides a power conversion system including a power converter and a power stabilizing device. The power converter includes a power conversion circuit connected to a direct current (DC) source via a DC distribution line and configured to convert and supply received DC power to a load, and a power conversion control unit configured to control operations of the power conversion circuit. The power stabilizing device is disposed between the DC distribution line and the power converter and configured to stabilize a DC voltage applied from the DC power source.

The power stabilizing device includes a current transformer and a control power source. The current transformer includes a transformer core, a primary winding connected in series between the DC distribution line and the power converter, and a secondary winding magnetically coupled to the primary winding through the transformer core.

The control power source is configured to perform current control of the current transformer to suppress DC magnetization of the current transformer caused by a DC current component of the primary current flowing through the primary winding while compensating for a variable component of the DC voltage input to the power converter. The control power source is configured to acquire current information or voltage information calculated from control information used by the power conversion control unit for control operations related to energization of the load and use the current information or voltage information as control information for the power stabilizing device.

For example, the estimate of the primary current is calculated by dividing a power value calculated from a voltage and a current applied from the power converter to the load by the DC voltage input to the power converter. The control power source acquiring this primary current estimate eliminates the need for the power stabilizing device to incorporate a current sensor for large currents to detect the primary current. Therefore, the number of components in the power stabilizing device can be reduced, thereby downsizing the power stabilizing device.

In the power conversion system of the present disclosure, the power stabilizing device is preferably housed in the same housing as the power converter. Integrating the power converter and the power stabilizing device into a single entity can eliminate wiring harnesses and connectors for signal transmission, thereby reducing the number of components and further downsizing the system.

Hereinafter, exemplary embodiments of the present disclosure will be described in detail with reference to the accompanying drawings, in which like reference numerals refer to like or similar elements and duplicated description thereof will be omitted.

As illustrated in FIG. 1, a power conversion system 90 according to a first embodiment includes a power converter 70 and a power stabilizing device 20 in a DC power distribution system.

The power converter 70 is connected to a direct-current (DC) power source 11 via a DC distribution line 12, and includes a power conversion circuit 72 that converts DC power received and supplies the converted power to a load, and a power conversion control unit 75 that controls the operation of the power conversion circuit 72. In the present embodiment, the "power conversion circuit" is a three-phase inverter circuit 72 and the "load" is a three-phase motor 80. The power stabilizing device 20 is disposed in series between the DC distribution line 12 and the power converter 70 to stabilize the DC voltage applied from the DC power source 11. In a configuration where the power stabilizing device 20 is disposed in a series arrangement, a sharing rate of the voltage of the DC power source by the power stabilizing device 20 is reduced, and the device capacity can be reduced.

Conventional Technique

Figure 11:
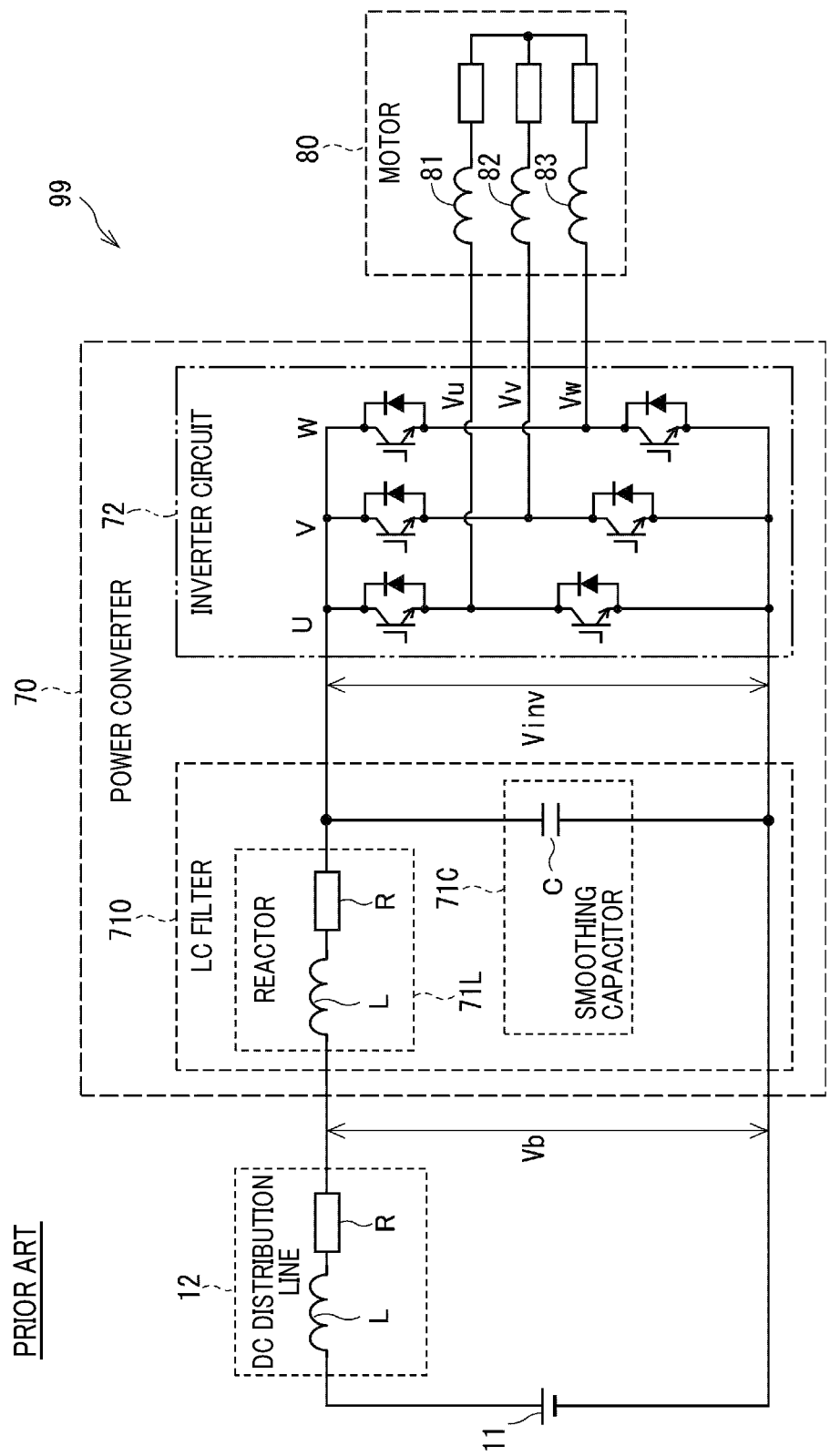
FIG. 11 is an illustration of a conventional power conversion system.

Prior to describing the present embodiment, a conventionally known technique will now be described with reference to FIG. 11. A typical power conversion system 99 includes a DC power source 11, a DC distribution line 12, and one or more power converters 70. Each power converter 70 illustrated in FIG. 11 converts DC power to three-phase AC power by means of an inverter circuit 72 and energizes U-, V-, and W-phase windings 81, 82, 83 of a three-phase motor 80. The DC voltage input to the inverter circuit 72 of the power converter 70 is hereafter referred to as an "inverter input voltage Vinv." The power converter 70 often has a built-in smoothing capacitor 71C on the input side to smooth the inverter input voltage Vinv.

In some power converters, a reactor 71L with an inductance component L and a resistance component R is additionally included to form an LC filter 710. The DC distribution line 12 has a wiring inductance L and a wiring resistance R. Thus, the C component of the smoothing capacitor 71C, the wiring 12, and the L component of the reactor 71L form an LC resonant circuit.

Harmonic currents generated in the power converter 70 due to switching operations of power elements, as an oscillation source, may cause LC resonance. The power converter 70 may become negative resistance characteristic under constant power control, which may excite LC resonance triggered by load variations and the like. Once resonance occurs, the DC voltage Vb may significantly vary due to impedance drop in the DC distribution line 12, or excessive resonance current may flow, which may cause overvoltage or overcurrent. In a configuration where a plurality of power converters 70 are connected to the DC distribution line 12, the LC resonance characteristics may become of higher order and more complex. Therefore, it is desired that a power stabilizing device suppress variations in DC voltage Vb and thereby stabilize the inverter input voltage Vinv.

JP 2002-272113 A discloses a DC reactor device corresponding to the power stabilizing device. For example, in the DC reactor device illustrated in FIG. 4 of JP 2002-272113 A, a primary winding current Idc1 (19) and a secondary winding current Idc2 (20) are detected, and the DC component of the primary winding current Idc1 is superimposed on the secondary winding current Idc2, thereby performing control to compensate for the DC demagnetization of the reactor. However, there has been an issue that detection of the primary winding current Idc1 with the total current flowing through the load requires a large current sensor capable of detecting large currents, leading to larger size and increased weight of the system.

In the present embodiment, a system configuration in which "current information or voltage information calculated from control information used for control operations related to energization of the motor 80" in the power converter is used as control information for the power stabilizing device. In the present embodiment, the primary current flowing through the primary winding is calculated by estimation operations, thereby eliminating the need to provide a current sensor for large currents in the power stabilizing device. The detailed configuration of each embodiment will now be described.

First Embodiment

Referring to FIGS. 1 to 4, the common configuration of each embodiment and the configuration of primary current estimation operations according to a first embodiment will be described. FIG. 1 illustrates the overall configuration of the power conversion system 90. As described above, the power conversion system 90 includes a power stabilizing device 20 and a power converter 70. A DC voltage Vb is applied to the power stabilizing device 20 from a DC power source 11 via a DC distribution line 12. An inverter input voltage Vinv is applied to the inverter circuit 72 of the power converter 70.

The power stabilizing device 20 includes a current transformer 30 and a control power source 50. The current transformer 30 includes a transformer core 33, a primary winding 31 and a secondary winding 32. The primary winding 31 is connected in series between the DC distribution line 12 and the power converter 70. The secondary winding 32 is connected to the control power source 50 and is magnetically coupled to the primary winding 31 through the transformer core 33. For simplicity, the turn ratio of the current transformer 30 is here 1:1. In cases where the turn ratio is 1:n, the voltage and current may be converted according to the turn ratio.

The primary current Iaux, which includes both a DC current component and a ripple current component, flows through the primary winding 31 that is a path from the DC power source 11 to the power converter 70. The DC current component of the primary current Iaux causes the transformer core 33 to be DC magnetized, disabling power stabilization control. In addition, the magnetic flux density of the transformer core 33 may increase and the required dimensions may become larger.

The control power source 50 performs current control of the current transformer 30 to suppress DC magnetization of the current transformer 30 due to the DC current component of the primary current Iaux while compensating for a varying component of the inverter input voltage Vinv. The current injected into the secondary winding 32 by the output voltage Vout of the control power source 50 to cancel out the DC current component of the primary current Iaux and thereby suppress DC magnetization of the current transformer 30 is referred to as a cancellation current Ict. The detailed control configuration of the control power source 50 will be described later with reference to FIGS. 2 and 3.

The power converter 70 includes an inverter circuit 72, a smoothing capacitor 71C, a voltage sensor 73 to detect the inverter input voltage Vinv, current sensors 74 to detect phase currents Iu, Iv, and a power conversion control unit 75. The inverter input voltage Vinv detected by the voltage sensor 73, the phase currents Iu, Iv detected by the current sensors 74, and a rotor rotation angle θ detected by a rotation angle sensor 85 installed on the motor 80 are input to the power conversion control unit 75.

As for a configuration for detecting phase currents, in the example illustrated in FIG. 1, two current sensors 74 provided for the U-phase winding 81 and the V-phase winding 82 detect two of three-phase currents Iu, Iv (U-phase and V-phase currents), and the other current (W-phase current) is calculated according to Kirchhoff's Current Law (i.e., a sum of three-phase currents=0). In an alternative configuration, all the three-phase currents may be detected. Alternatively, a shunt resistor may be disposed between each phase lower-arm element of the inverter circuit 72 and the low-side line to detect phase currents in a three-shunt scheme. Still alternatively, a shunt resistor may be disposed on a bus line for all three phases, and the phase currents may be detected in a single shunt scheme.

The power conversion control unit 75 generates gate signals to operate the inverter circuit 72 through control operations, such as current feedback control based on input information. The power conversion control unit 75 calculates, from the "control information used for control operations related to energization of the motor 80", a primary current estimate Iaux_est that is "current information", and transmits it to the control power source 50 of the power stabilizing device 20 along with the inverter input voltage Vinv that is "voltage information". The detailed control configuration of the power conversion control unit 75 will be described later with reference to FIG. 4.

In addition, in the present embodiment, the power stabilizing device 20 and the power converter 70 are housed in the same housing 900, as indicated by the bold dashed-dotted line. If the power stabilizing device 20 and the power converter 70 were housed in two different housings, a wiring harness and a connector would be required to transmit signals, such as the primary current estimate Iaux_est, from the power conversion control unit 75 to the control power source 50.

Therefore, housing the power stabilizing device 20 and the power converter 70 in the same housing and integrating them as a single entity allows the wiring harnesses and the connector for signal transfer to be eliminated, thereby achieving reduction of the number of components and downsizing. Furthermore, mounting the control power source 50 and the power conversion control unit 75 on the same board in the same housing or sharing the microcomputer and the power circuit, thereby achieving further integration and further downsizing.

Figure 2:
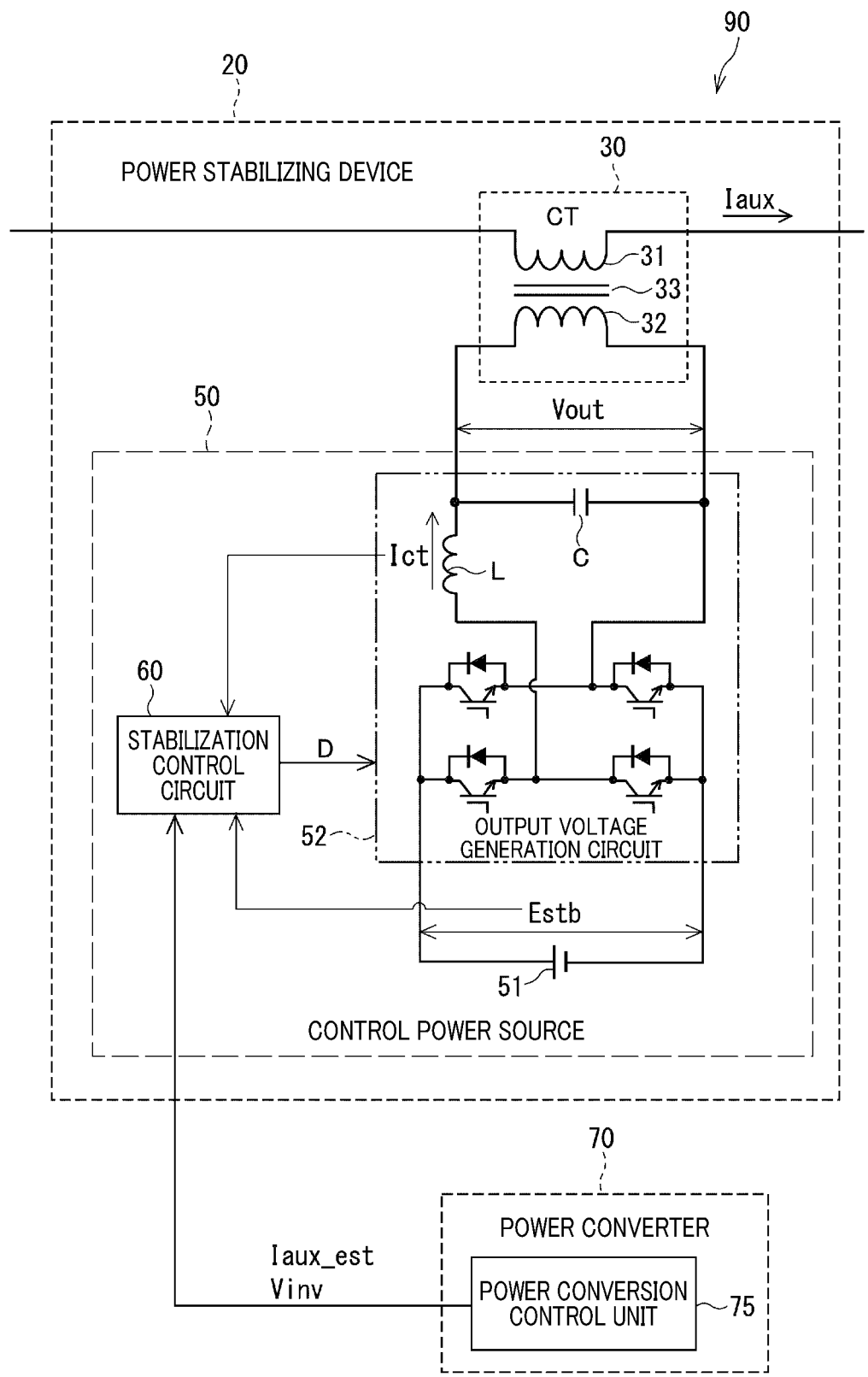
FIG. 2 is an illustration of an example configuration of a control power source.
Figure 3:
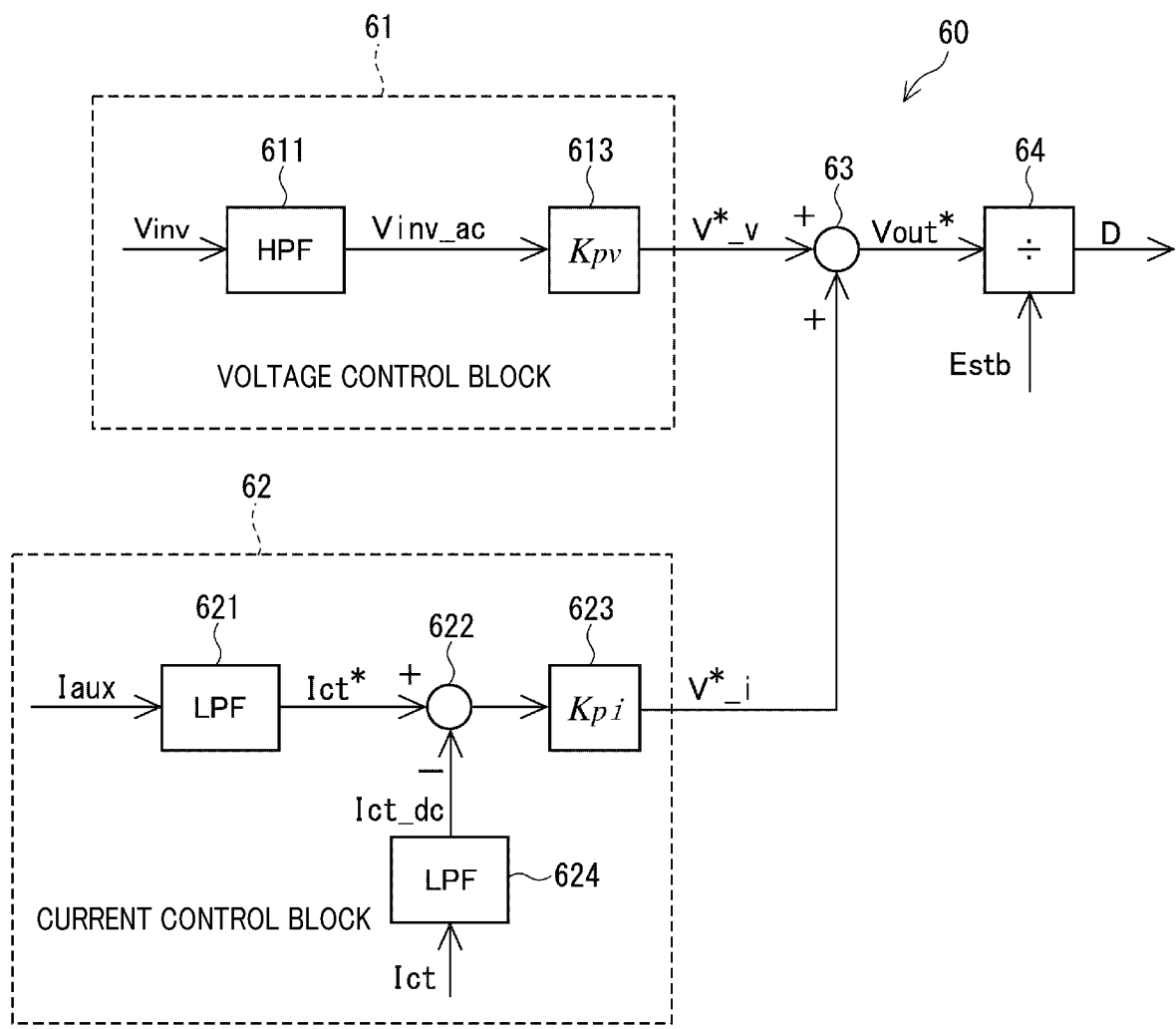
FIG. 3 is a control block diagram of a stabilization control circuit.

Referring to FIGS. 2 and 3, the configuration of the control power source 50 of the power stabilizing device 20 and the secondary winding 32 of the current transformer 30 will now be described. The control power source 50 includes an operating power source 51, an output voltage generation circuit 52, and a stabilization control circuit 60. The operating power source 51 may be a dedicated DC power source as illustrated in FIG. 2. Alternatively, the DC voltage Vb of the DC power source 11 may be used through connection to a distribution line branched from the DC distribution line 12.

The output voltage generation circuit 52 operates according to commands from the stabilization control circuit 60 to generate an output voltage Vout to be applied to the secondary winding 32. The output voltage generation circuit 52 is formed of a high-speed PWM-controlled single-phase inverter circuit or the like, to which an LC filter may be added as needed. The output voltage Vout is generated by converting the power-source voltage Estb of the operating power source 51 through high-speed switching operations of a plurality of switching elements of the single-phase inverter circuit under PWM control.

The stabilization control circuit 60 calculates a duty ratio D for PWM control of the output voltage generation circuit 52 based on the inverter input voltage Vinv, the power-source voltage Estb of the operating power source 51, the cancelation current Ict, and the primary current Iaux. FIG. 3 illustrates a configuration of operations of the stabilization control circuit 60. The stabilization control circuit 60 includes a voltage control block 61, a current control block 62, an adder 63, and a divider 64.

The voltage control block 61 calculates a voltage control term $V^*\_v$ to generate an output voltage Vout that cancels out the DC voltage ripple. The voltage control block 61 in the feedback control configuration illustrated in FIG. 3 includes a high-pass filter (in FIG. 3 and hereinafter referred to as "HPF") 611 and a gain multiplier 613. The HPF 611 cuts off a DC component in the inverter input voltage Vinv including the ripple voltage and extracts a ripple voltage component Vinv_ac.

The gain multiplier 613 multiplies the ripple voltage component Vinv_ac by a gain Kpv and thereby calculates the voltage control term $V^*\_v$.

The current control block 62 controls the DC current component of the current transformer 30 and calculates a current control term $V^*\_i$ to suppress DC magnetization. The current control block 62 illustrated in FIG. 3 includes low-pass filters 621, 624 (in FIG. 3 and hereinafter each referred to as "LPF"), a deviation calculator 622, and a current control unit 623. The LPF 621 receives the primary current Iaux. The LPF 624 receives the cancellation current Ict. In the present embodiment, not the value detected by the current sensor, but a primary current estimate Iaux_est calculated from control information of the power conversion control unit 75 is used as the primary current Iaux.

The LPF 621 cuts off all but the DC current component of the primary current Iaux and outputs the DC current component Ict*. The LPF 624 cuts off all but the DC current component of the cancellation current Ict and outputs the DC current component Ict_dc. The deviation calculator 622 calculates a current deviation between the DC current component Ict* of the primary current and the DC current component Ict_dc of the cancellation current actually detected. The current control unit 623 multiplies the current deviation by a proportional control gain Kpi to calculate the current control term V*_i. The gain Kpi includes a factor in the resistance dimension that converts a value in the current dimension to a value in the voltage dimension. Alternatively, the current control term V*_i may be calculated by proportional integral control that is a combination of integral control and proportional control. The integral control block is not shown.

The adder 63 adds the voltage control term V*_v and the current control term V*_i to calculate a voltage command value Vout* for the output voltage generation circuit 52. The divider 64 divides the voltage command value Vout* by the power-source voltage Estb of the operating power source 51 to calculate the duty ratio D for the output voltage generation circuit 52. When the output voltage generation circuit 52 operates under PWM control based on the duty ratio D, the output voltage Vout is applied to the secondary winding 32 of the current transformer 30.

The voltage control term V*_v of the voltage command value Vout* is reflected in the output voltage Vout, which generates an output voltage Vout corresponding to the ripple voltage included in the inverter input voltage Vinv across the primary winding 31, thereby compensating for the varying component of the inverter input voltage Vinv.

Furthermore, the current control term V*_i of the voltage command value Vout* is reflected in the output voltage Vout, which provides the magnetic flux component that superimposes the cancellation current Ict in the secondary winding 32. Therefore, the cancellation current Ict in the secondary winding 32 cancels the DC flux component generated in the primary winding 31 of the current transformer 30.

The control power source 50 of the power stabilizing device 20 performs current control of the current transformer 30 to suppress DC magnetization of the current transformer 30 due to the DC current component of the primary current Iaux while compensating for the varying component of the inverter input voltage Vinv. This stabilizes the DC voltage Vb. In addition, DC magnetization of the current transformer 30 can be suppressed and the current transformer can be downsized.

Here, if the control response of the current control block 62 is earlier than the control response of the voltage control block 31, the magnetic flux in the current transformer will constantly be controlled to zero, which disables proper generation of the output voltage. That is, control interference between ripple voltage cancellation and DC flux control will occur. Therefore, the control response of the voltage control block 61 is configured to be earlier than that of the current control block 62 to prevent control interference.

As described above, the control operations of the control power source 50 require information about the primary current Iaux and the cancellation current Ict, and a current sensor is needed to detect them. In particular, the primary winding 31 is commonly designed with a small number of turns due to high power current flowing through the power converter 70. This leads to a larger wire diameter of the primary winding 31 and a larger core of the current sensor, which may raise an issue that the power stabilizing device 20 grows in size.

The control power source 50 acquires the primary current estimate Iaux_est that is the current information calculated from the control information of the power conversion control unit 75, to perform current control of the current transformer 30. This eliminates the need for a current sensor to detect the primary current Iaux in the power stabilizing device 20. In addition, the control power source 50 acquires the inverter input voltage Vinv that is the voltage information calculated from the control information of the power conversion control unit 75, to perform current control of the current transformer 30. This eliminates the need for a voltage sensor to detect the inverter input voltage Vinv in the power stabilizing device 20. Even if the detected value for the voltage sensor 73 is transmitted as it is, the inverter input voltage is interpreted to be the voltage information acquired by calculation of "multiplying the inverter input voltage Vinv by one".

Figure 4:
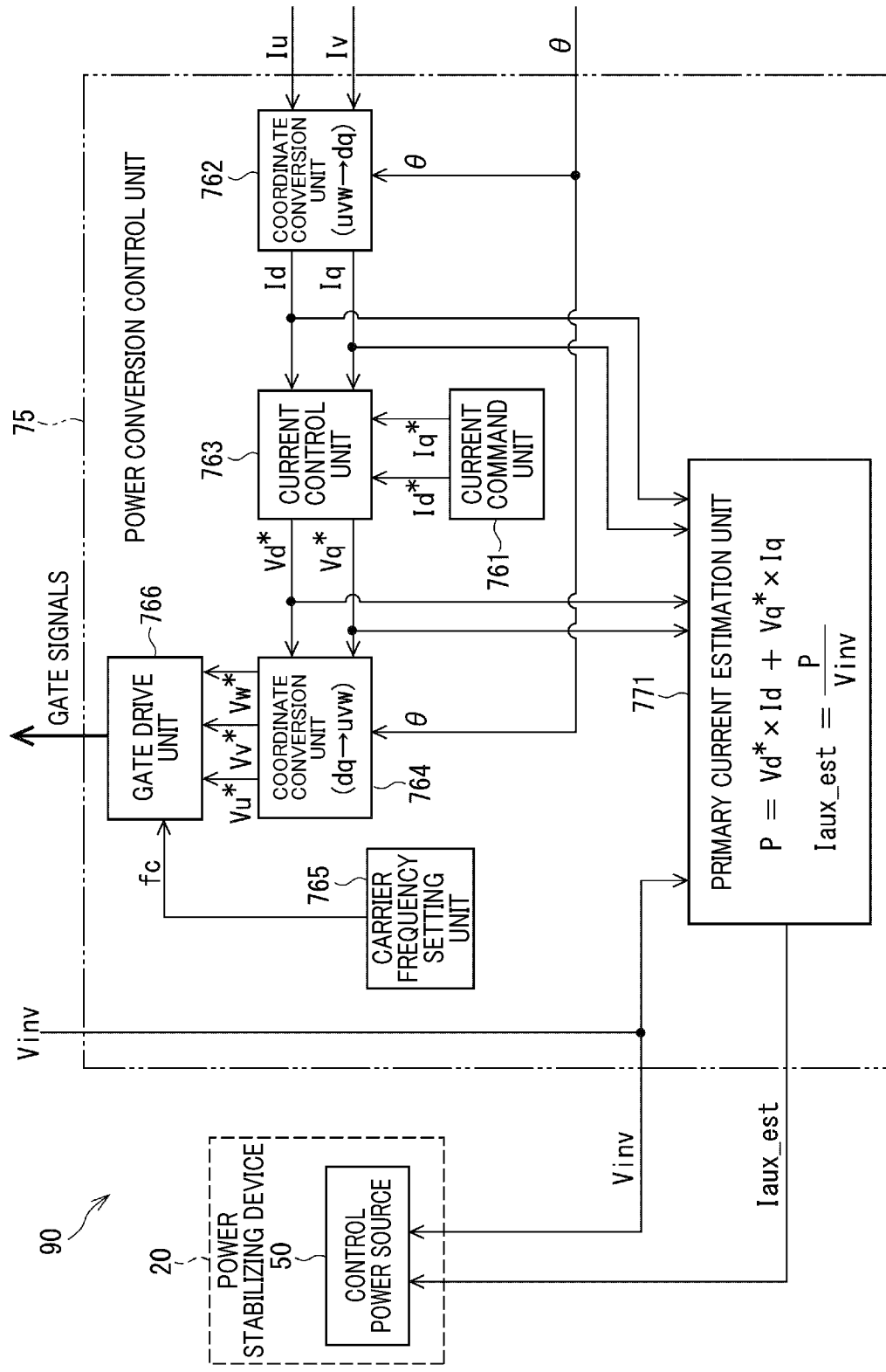
FIG. 4 is a control block diagram illustrating a configuration of primary current estimation operation according to the first embodiment.

Referring to FIG. 4, the general configuration of the power conversion control unit 75 and the operational configuration of the primary current estimate Iaux_est by the primary current estimation unit 771 of the first embodiment will be described. The power conversion control unit 75 controls the output of the inverter circuit 72 using current feedback control by vector control and PWM control, and drives the motor 80. That is, the power conversion control unit 75 converts the phase currents for the motor 80 detected by the phase current sensors 74 into the dq-axis currents in the rotational coordinate system, and calculates the voltage command value such that a deviation from the dq-axis current command value approaches 0. The power conversion control unit 75 then generates gate signals from the voltage command value using PWM control to operate the switching elements of the inverter circuit 72.

In detail, the power conversion control unit 75 includes a current command unit 761, a coordinate conversion unit 762, a current control unit 763, a coordinate conversion unit 764, a carrier frequency setting unit 765, and a gate drive unit 766. The current command unit 761 calculates dq-axis current command values Id*, Iq* based on commands from an external high-level control circuit or the like. The coordinate conversion unit 762 converts the phase currents Iu, Iv into the d-axis current Id that is an excitation current, and the q-axis current Iq that is a torque current, using a rotor rotation angle θ. The current control unit 763 calculates the dq-axis voltage command values Vd*, Vq* through PI control operations or the like, such that a deviation between each of the detected currents Id, Iq and a corresponding one of the current command values Id*, Iq* approaches 0.

The coordinate conversion unit 764 converts the dq-axis voltage command values Vd*, Vq* into three-phase current command values Vu*, Vv*, Vw* using the rotor rotation angle θ. The carrier frequency setting unit 765 sets a carrier frequency fc for PWM control. The carrier frequency fc may be constant, for example, independent of the rotor rotation speed, or may be set variable depending on the rotor rotation speed. The gate drive unit 766 compares the duty ratio for each phase calculated from the three-phase current command values Vu*, Vv*, Vw* with a carrier to generate gate signals for the inverter circuit 72.

Furthermore, the primary current estimation unit 771 of the first embodiment calculates power P of the power converter 70 from the detected dq-axis currents Id, Iq and the voltage command values Vd*, Vq*, using Equation (1). Here, the current command values Id*, Iq* may be used instead of the detected currents Id, Iq as long as the response of the current control is fast enough.

$$P = Vd^* \times Id + Vq^* + Iq \tag{1}$$

The primary current estimation unit 771 then divides the acquired power P of the power converter 70 by the inverter input voltage Vinv to calculate an estimate Iaux_est of primary current flowing into the power converter.

$$Iaux\_est = P/Vinv \quad (2)$$

The primary current estimate Iaux_est is output from the power conversion control unit 75 to the control power source 50. The calculation result of Equation (2) is an instantaneous value and does not include the loss of the switching elements of the power converter 70. Therefore, when using the primary current estimate as the primary current Iaux, the ripple current component may be removed by LPF processing, or a gain may be multiplied to perform loss correction for the switching elements. In addition to the primary current estimate Iaux_est, the inverter input voltage Vinv detected by the voltage sensor 73 is output to the control power source 50.

Advantages of First Embodiment

[1] In the power conversion system 90, the control power source 50 of the power stabilizing device 20 acquires the current or voltage information calculated from the "control information used by the power conversion control unit 75 for control operations related to energization of the motor 80" and uses it as control information for the power stabilizing device 20. Specifically, the control power source 50 acquires the primary current estimate Iaux_est and the inverter input voltage Vinv. This eliminates the need for the power stabilizing device 20 to incorporate a current sensor for large currents to detect the primary current Iaux and a voltage sensor to detect the inverter input voltage Vinv. Therefore, the number of components in the power stabilizing device 20 can be reduced, thereby downsizing the power stabilizing device 20.

[2] The power stabilizing device 20 is housed in the same housing 900 as the power converter 70. This can eliminate wiring harnesses and connectors for signal transfer from the power conversion control unit 75 to the control power source 50, thereby further reducing the number of components and thus leading to further downsizing.

[3] The stabilization control circuit 60 of the control power source 50 calculates the voltage control term V*_v to cancel the ripple voltage Vinv_ac of the inverter input voltage Vinv and the current control term V*_i to inject a cancellation current Ict into the secondary winding 32 to cancel the DC current component of the primary current Iaux that may cause DC magnetomotive force in the primary winding 31. The stabilization control circuit 60 then operates the output voltage generation circuit 52 based on the voltage command value Vout* acquired by adding the voltage control term V*_v and the current control term V*_i to apply an output voltage Vout to the secondary winding 32. This allows the control power source 50 to suppress DC magnetization of the current transformer 30 while compensating for the varying component of the inverter input voltage Vinv.

Second Embodiment

Figure 5:
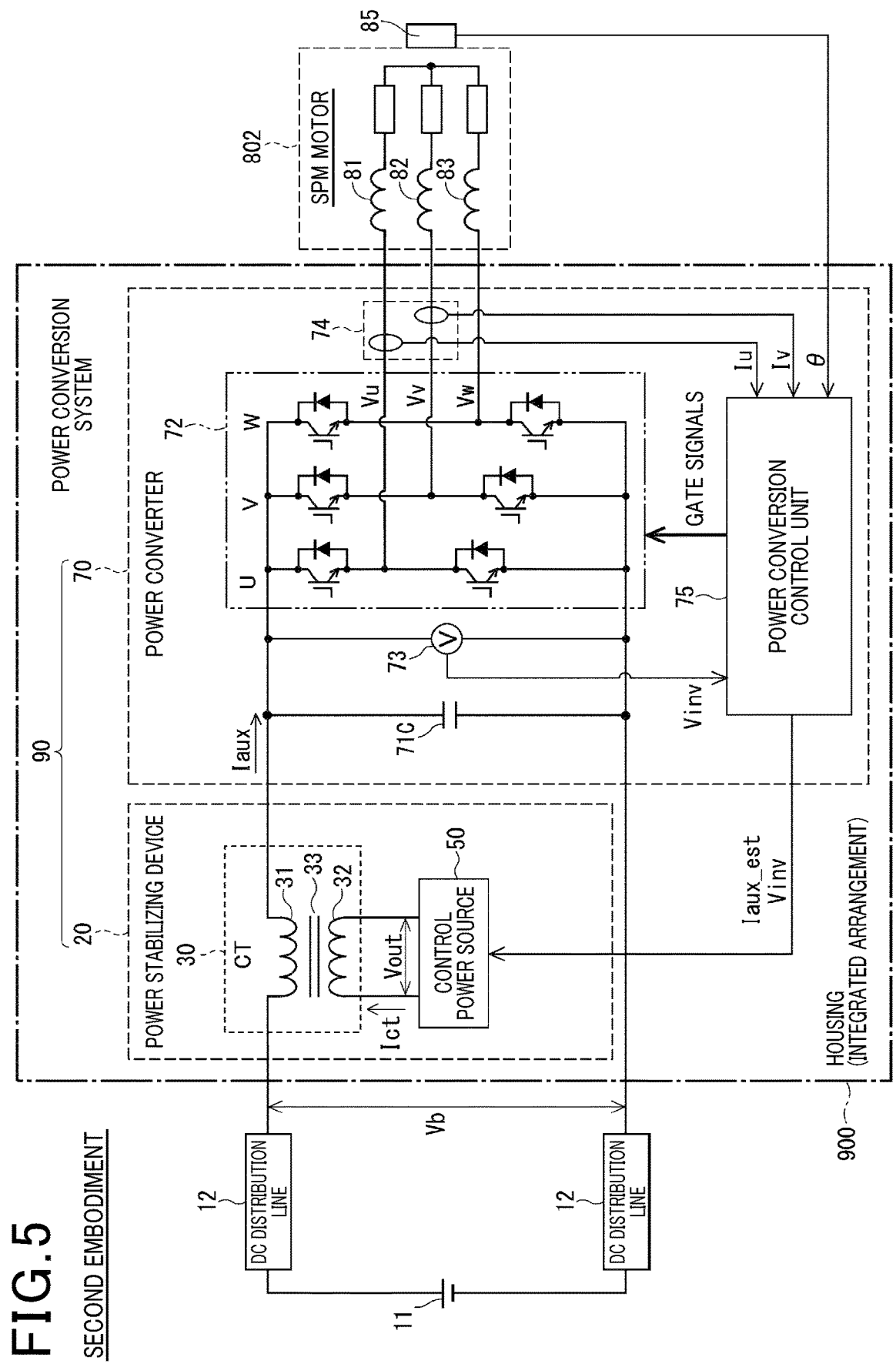
FIG. 5 is an illustration of the overall configuration of a power conversion system according to a second embodiment.
Figure 6:
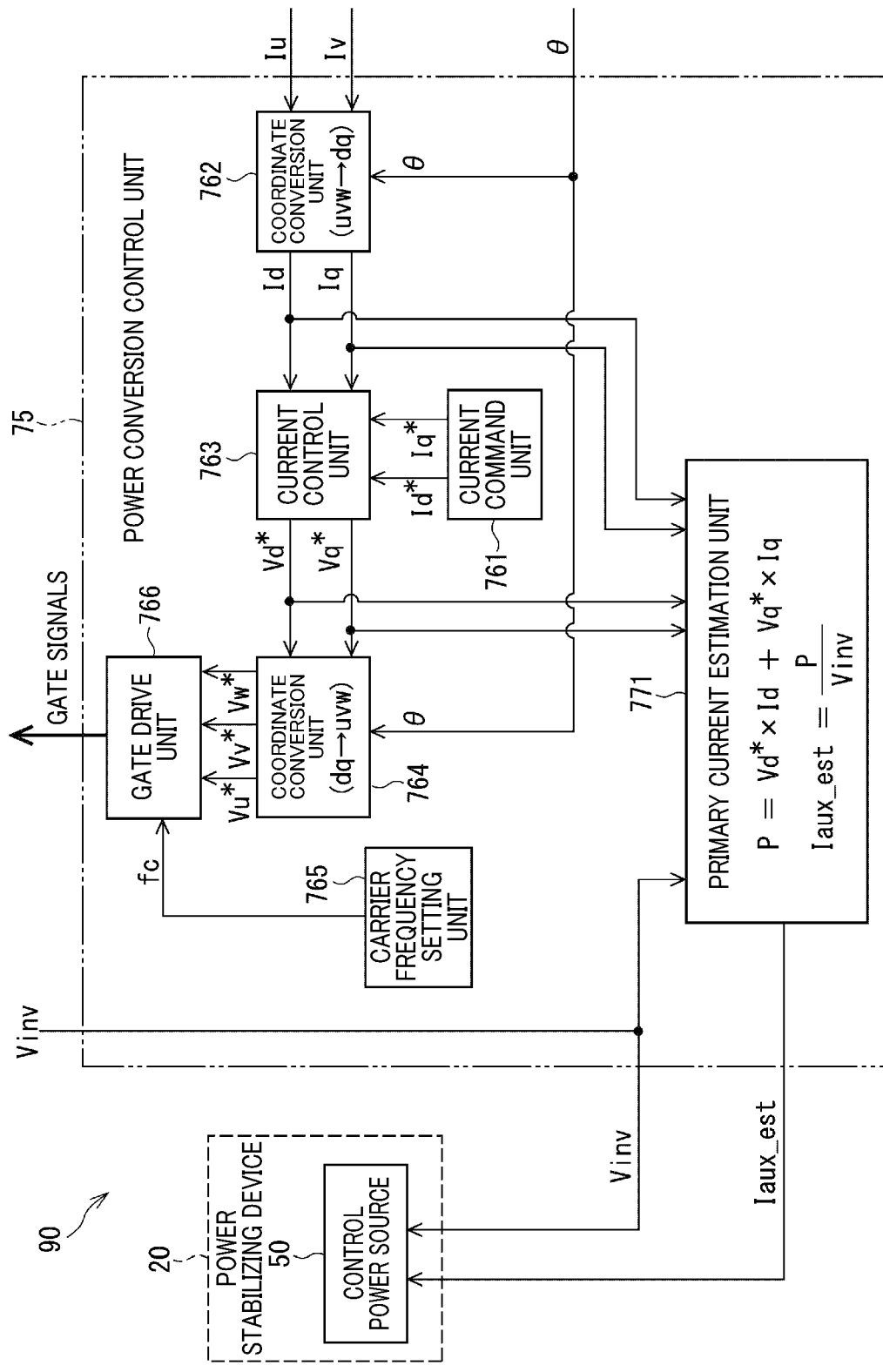
FIG. 6 is a control block diagram illustrating a configuration of primary current estimation operation according to the second embodiment.

A second embodiment will now be described with reference to FIGS. 5 and 6. As illustrated in FIG. 5, in the second embodiment, the motor driven by the power converter 70 is a surface permanent magnet (SPM), that is, a surface magnet type motor 802. The rest of FIG. 5 is the same as in FIG. 1. In the SPM motor, the d-axis current Id is basically controlled to "Id=0". Therefore, as illustrated in FIG. 6, the primary current estimation unit 772 acquires only the q-axis current Iq that is the torque current, and multiplies the q-axis current Iq by a factor k according to Equation (3) to calculate the primary current estimate Iaux_est.

$$Iaux\_est = k \times Iq \quad (3)$$

As in the first embodiment, the control power source 50 performs current control of the current transformer 30 using the primary current estimate Iaux_est transmitted from the power conversion control unit 75. In the second embodiment, limiting the motor driven by the power converter to the SPM motor can eliminate the need for calculation of power P in the primary current estimation operation, thereby simplifying the calculation.

Third Embodiment

Figure 7:
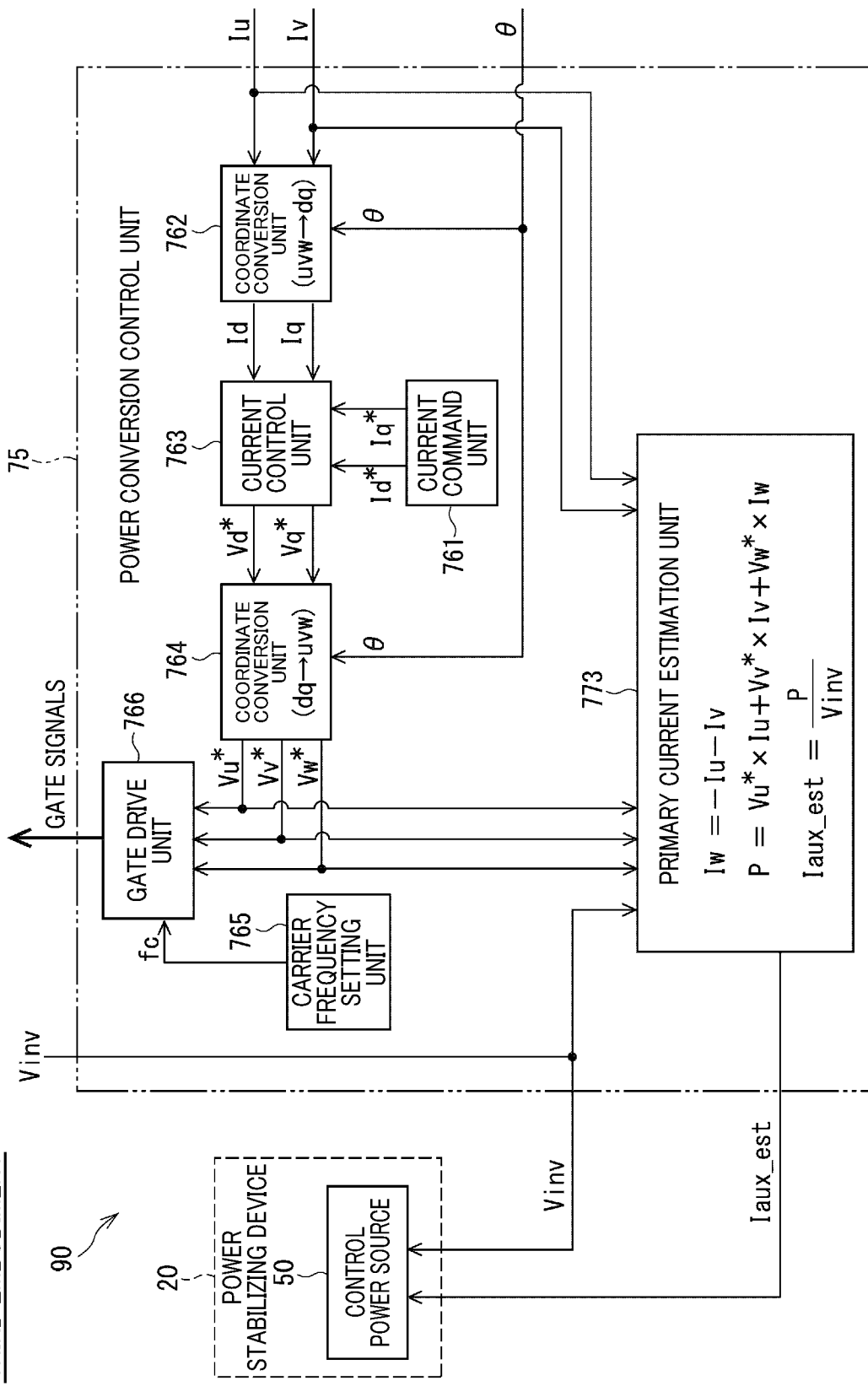
FIG. 7 is a control block diagram illustrating a configuration of primary current estimation operation according to a third embodiment.

A third embodiment will now be described with reference to FIG. 7. The overall configuration of the power conversion system 90 is the same as in FIG. 1 of the first embodiment. The primary current estimation unit 773 calculates three-phase power P using Equation (4) based on the respective phase currents Iu, Iv, Iw and respective phase voltage command values Vu*, Vv*, Vw* for the motor 80. In cases where two of the three-phase currents are detected by the current sensors 74, the other one of the three-phase currents is calculated by Kirchhoff's Current Law. For example, the W-phase current is calculated from the U-phase and V-phase currents according to the following equation "Iw=−Iu−Iv".

$$P = Vu^* \times Iu + Vv^* \times Iv + Vw^* \times Iw \quad (4)$$

Instead of using the phase voltage command values Vu*, Vv*, Vw*, phase voltages detected directly and then processed by the LPF may be used. Subsequently, as in the first embodiment, the primary current estimate Iaux_est is calculated by dividing the power P by the inverter input voltage Vinv using Equation (2). While the power conversion control unit 75 in FIG. 7 includes the coordinate conversion units 762, 764 and performs vector control as in the first embodiment, the primary current estimation in the third embodiment can also be applied to power conversion control unit that does not perform vector control by means of coordinate conversion.

Fourth Embodiment

Figure 8:
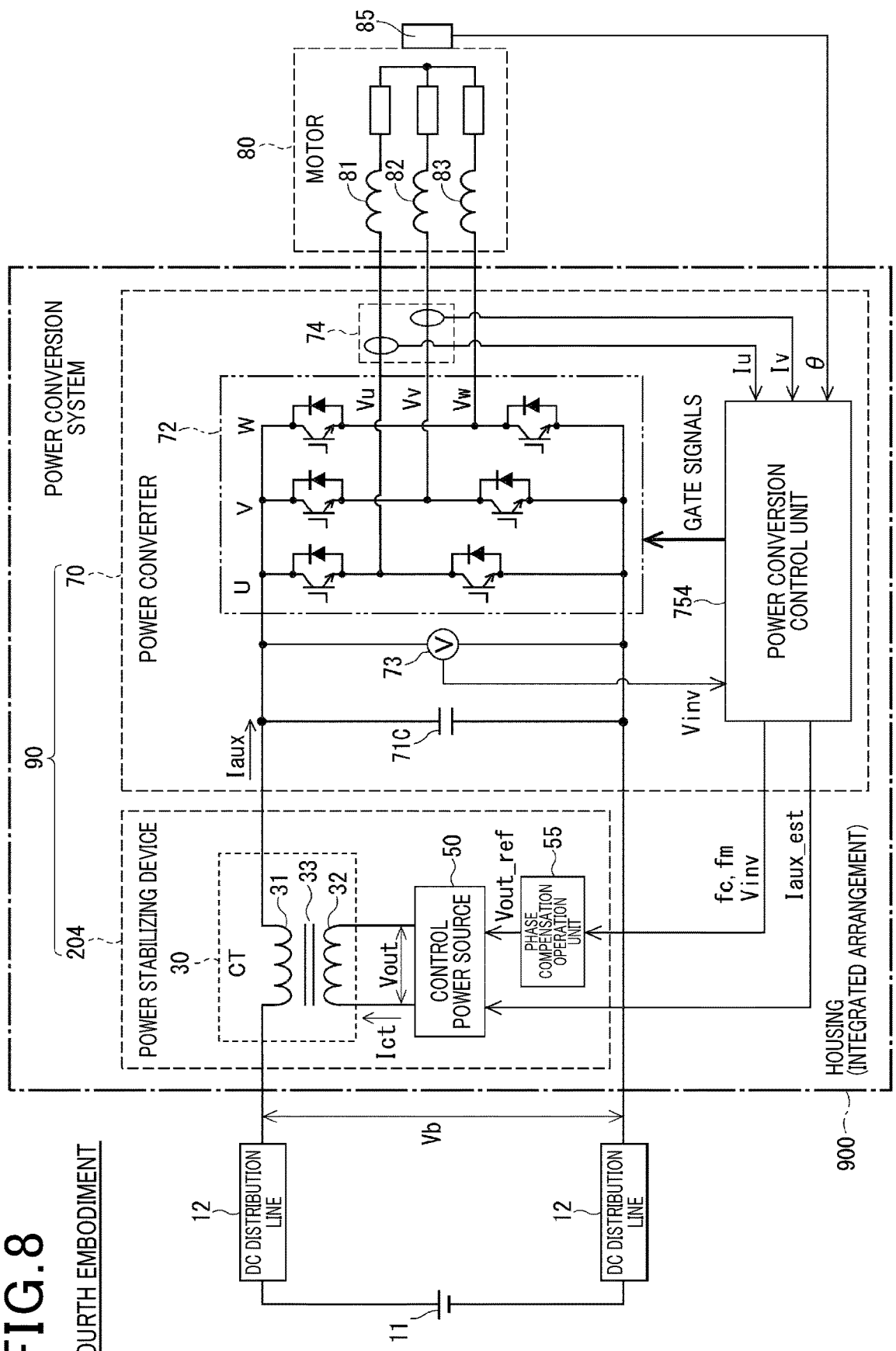
FIG. 8 is an illustration of the overall configuration of a power conversion system according to a fourth embodiment.
Figure 9:
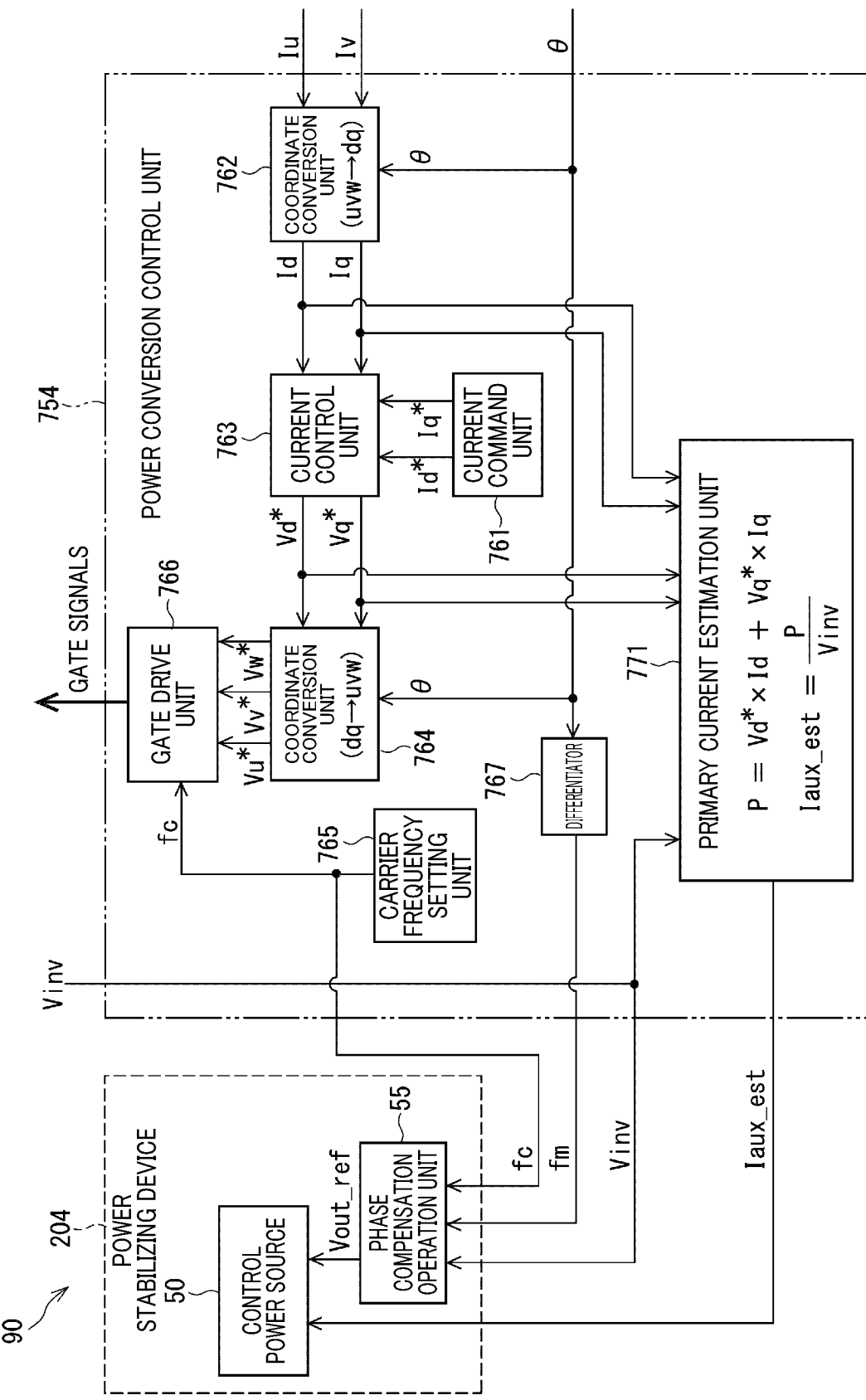
FIG. 9 is a control block diagram illustrating a configuration in which frequency information from a power conversion control unit is used for phase compensation operation in the power stabilizing device according to the fourth embodiment.
Figure 10:
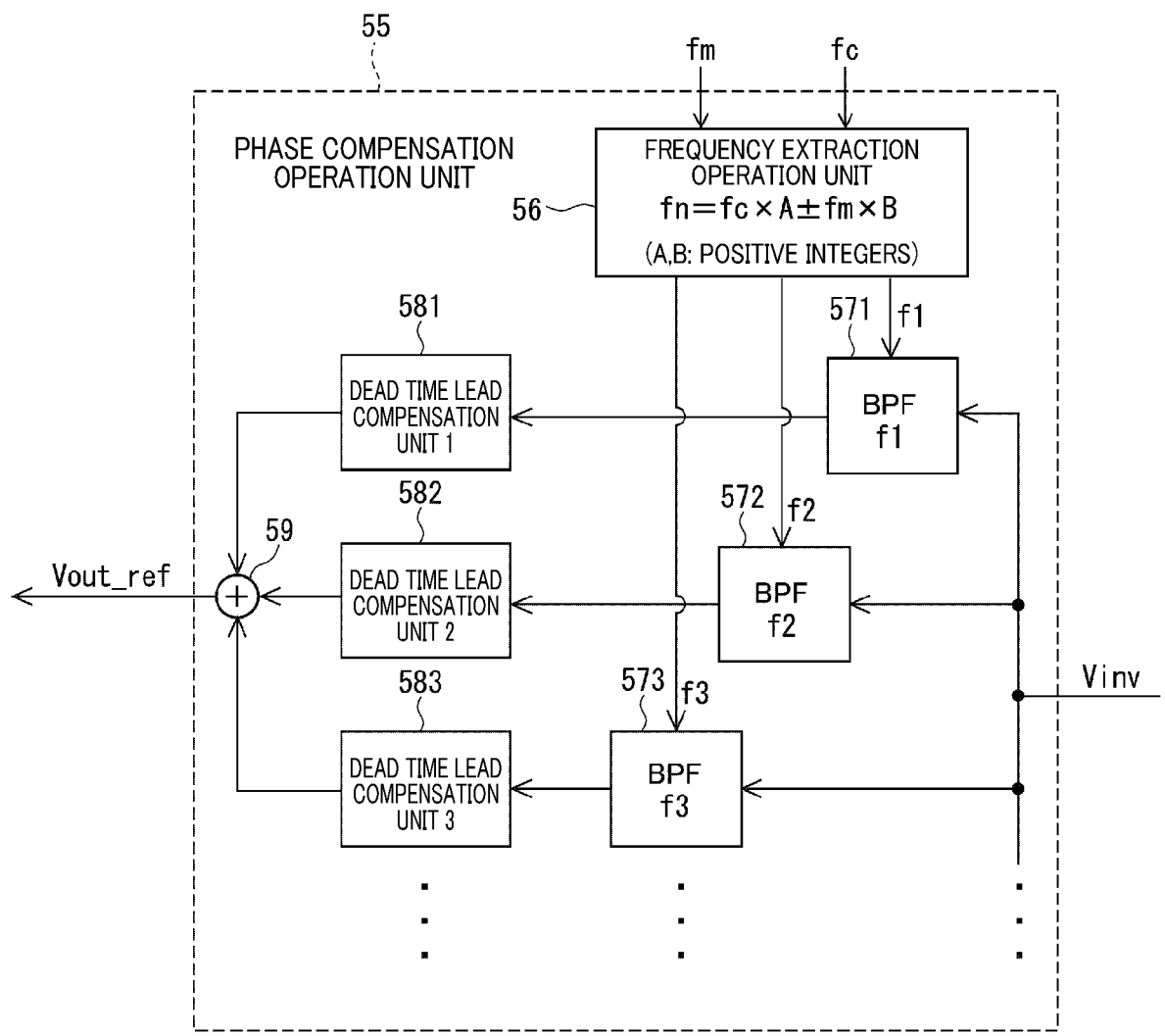
FIG. 10 is a control block diagram of a phase compensation operation unit.

A fourth embodiment will now be described with reference to FIGS. 8 to 10. Since the power stabilizing device 20 compensates for the high frequency voltage generated by the power converter 70, dead times occur, such as delay times of the isolated circuits and drive elements of the control power source 50 and operation times of the microcontroller, which deteriorates the control performance. To improve control performance, the command value Vinv has to be lead compensated for these dead times. However, the voltage generated by the power converter 70 includes a plurality of frequency spectra. Since each frequency spectrum has a different delay phase angle corresponding to the dead time, it is necessary to perform phase compensation according to each frequency.

As a control configuration to cope with such an issue, the power stabilizing device 204 of the fourth embodiment includes a phase compensation operation unit 55 in addition to the configuration of the power stabilizing device 20 of the first embodiment. The power conversion control unit 754 of the fourth embodiment includes a differentiator 767 that calculates the motor rotation speed fm by differentiating the rotor rotation angle θ of the motor 80.

The phase compensation operation unit 55 receives the inverter input voltage Vinv, the motor rotation speed fm, and the carrier frequency fc. The motor rotation speed fm and the carrier frequency fc correspond to "frequency information" among the control information of the power converter 70. The power stabilizing device 204 further performs phase compensation operation to compensate for a control delay of the control power source 50 based on the frequency information acquired from the power conversion control unit 754.

The center frequency of the harmonic current spectrum that occurs in the power converter 70 is uniquely determined as a discrete spectrum shown in Equation (5) based on the motor speed fm, the carrier frequency fc, and the modulation scheme, such as three-phase modulation, two-phase modulation or the like, of the power converter 70. The factors A and B in Equation (5) are positive integers.

$$fn = fm \times A \pm fc \times B \qquad (5)$$

Since each frequency spectrum is uniquely determined by the discrete spectrum, the dead times can be compensated by providing a bandpass filter that corresponds to each frequency spectrum and performing phase lead compensation for each frequency spectrum. As illustrated in FIG. 10, the phase compensation operation unit 55 includes a frequency extraction operation unit 56, a plurality of bandpass filters ("BPFs" in FIG. 10) 571, 572, 573, . . . a plurality of dead time lead compensation units 581, 582, 583, . . . and an adder 59. The frequency extraction operation unit 56 calculates the center frequency fn (n=1, 2, 3, . . . ) of each frequency spectrum according to Equation (5).

The ripple component of the detected inverter input voltage Vinv is separated into discrete frequency spectra by the plurality of bandpass filters 571, 572, 573, . . . The center frequencies fn of the bandpass filters 571, 572, 573, . . . are variable depending on the motor rotation speed fm and the carrier frequency fc as expressed in Equation (5). The signal separated into each frequency spectrum is phase compensated for a delay phase corresponding to the dead time in a corresponding one of a plurality of dead time lead compensation units 581, 582, 583, . . .

The compensated signals for the respective frequency spectra are added together again in the adder 59 to calculate an output voltage reference value Vout_ref. The output voltage reference value Vout_ref is output to the control power source 50 and serves as a compensation command value for the output voltage Vout. That is, the compensation command value replaces the ripple voltage component Vout* in the voltage control block 61 illustrated in FIG. 3. Although in FIGS. 8 and 9, the phase compensation operation unit 55 is shown outside the control power source 50 for convenience, it may be interpreted that the phase compensation operation unit 55 may be included in the stabilization control circuit 60 of FIG. 2.

In the fourth embodiment, the control performance of the power stabilizing device 20 can be improved by compensating for the control delay of the control power source 50 based on the frequency information acquired from the power conversion control unit 754. In order to reduce the number of bandpass filter configuration stages as compared to the configuration illustrated in FIG. 10, passband widths of the bandpass filters may be increased, and a plurality of adjacent frequency spectra may be compensated for dead time collectively. Although the compensation performance is slightly reduced, the operation may be simplified.

Other Embodiments (a) In the above embodiments, the motor 80 to be driven by the power converter 70 is a three-phase motor. Alternatively, the motor 80 may be a single-phase, two-phase, or four or more multi-phase motor. In the above embodiments, the power converter 70 is configured to drive the motor 80. In some alternative embodiments, the power converter 70 may be configured to supply power to loads other than the motor. In the above embodiments, the power conversion circuit 72 of the power converter 70 is configured to include only one inverter circuit. In some alternative embodiments, the power conversion circuit 72 of the power converter 70 may be configured to include a plurality of inverter circuits. The power converter 70 only has to be capable of outputting the current or voltage information calculated from the control information to the control power source 50. The power conversion circuit 72 may be a DC-DC converter or the like, not limited to the inverter circuit.

(b) As described above, it is preferable for the power stabilizing device 20 to be housed in the same housing 900 as the power converter 70 and to be configured in an integrated manner. The power conversion system 90 of the present disclosure may have the power stabilizing device 20 and the power converter 70 housed in individual housings, and the control information may be communicated between the respective housings. In such a configuration, although wiring harnesses and connector components would be required, an overall benefit would be ensured because they account for a smaller proportion of the mounting space and component costs as compared to the current and voltage sensors. This is also advantageous for retrofitting existing devices.

(c) In each block diagram of the above embodiments, the primary current estimation units 771-773 are illustrated inside the power conversion control unit 75. In some alternative embodiments, the primary current estimation operations may be performed on the control power source 50 side. In the first and third embodiments, the calculation of power P may be performed on the power conversion control unit 75 side, and the calculation of dividing the power P by the inverter input voltage Vinv may be performed on the control power source 50 side. In particular, in a configuration where boards and microcomputers are shared, there is no substantial distinction in the operation entity.

(d) In the above embodiments, the control power source 50 acquires both the primary current estimate Iaux_est and the inverter input voltage Vinv from the power conversion control unit 75, such that the power stabilizing device needs neither a current sensor for detecting the primary current nor a voltage sensor for detecting the inverter input voltage. Alternatively, the control power source 50 may receive only one of the primary current estimate Iaux_est and the inverter input voltage Vinv from the power conversion control unit 75, and the power stabilizing device may be provided with the current or voltage sensor to detect the other. For example, even in a configuration where the control power source 50 acquires only the primary current estimate Iaux_est, and the power stabilizing device 20 may include the voltage sensor, downsizing can be achieved by omitting the current sensor for high currents.

(e) The configuration of the output voltage generation circuit 52 of the control power source 50 is not limited to the configuration illustrated in FIG. 2, but may use a chopper circuit or other circuit disclosed in JP 2002-272113 A. The operating scheme of the output voltage generation circuit 52 is not limited to the PWM control scheme based on the duty ratio D, but any operating scheme may be used to generate the output voltage Vout.

The present disclosure is not limited to each of the above-described embodiments and can be applied to various embodiments without departing from the principles and spirit of the present disclosure.

In the above-described embodiments and modifications, the control unit and its method described in the present disclosure may be implemented by a dedicated computer including a processor and a memory programmed to execute one or more functions embodied by computer programs. Alternatively, the control unit and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible, computer-readable storage medium.

The present disclosure is described in compliance with the embodiments. However, it should be appreciated that the present disclosure is not limited to the embodiments or the structures thereof. The present disclosure encompasses various modified examples and modifications within the range of equivalency. In addition, the scope of the present disclosure and the range of ideas thereof include various combinations and forms and other combinations and forms additionally including one or more elements or a portion of one element.

What is claimed is:

1. A power conversion system comprising:
   a power converter including a power conversion circuit connected to a direct current (DC) source via a DC distribution line and configured to convert and supply received DC power to a load, and a power conversion control unit configured to control operations of the power conversion circuit; and
   a power stabilizing device disposed between the DC distribution line and the power converter and configured to stabilize a DC voltage applied from the DC power source,
   wherein the power stabilizing device comprises:
   a current transformer including a transformer core, a primary winding connected in series between the DC distribution line and the power converter, and a secondary winding magnetically coupled to the primary winding through the transformer core; and
   a control power source configured to perform current control of the current transformer to suppress DC magnetization of the current transformer caused by a DC current component of the primary current flowing through the primary winding while compensating for a variable component of the DC voltage input to the power converter,
   the control power source is configured to acquire current information or voltage information calculated from control information used by the power conversion control unit for control operations related to energization of the load and use the current information or voltage information as control information for the power stabilizing device.

2. The power conversion system according to claim 1, wherein
   the power stabilizing device is housed in a same housing as the power converter.

3. The power conversion system according to claim 1, wherein
   the load of the power converter is a surface magnet type motor,
   the power conversion control unit or the control power source is configured to multiply a q-axis current through the motor by a factor to calculate an estimate of the primary current, and
   the control power source is configured to perform current control of the current transformer using the estimate of the primary current.

4. The power conversion system according to claim 1, wherein
   the power conversion control unit or the control power source is configured to calculate power of the power converter from a voltage across the load and a current through the load, and divide the power of the power converter by a DC voltage input to the power converter to calculate an estimate of the primary current, and
   the control power source is configured to perform current control of the current transformer using the estimate of the primary current.

5. The power conversion system according to claim 1 wherein
   the power stabilizing device is further configured to perform phase compensation operation to compensate for a control delay of the control power source based on frequency information acquired from the power conversion control unit.

6. The power conversion system according to claim 1 wherein
   the control power source is configured to calculate a voltage control term to cancel a ripple voltage of the DC voltage input to the power converter and a current control term to inject a cancellation current into the secondary winding so as to cancel a DC current component of the primary current through the primary winding that causes DC magnetomotive force in the primary winding, and then operate an output voltage generation circuit based on a voltage command value acquired by adding the voltage control term and the current control term to thereby apply an output voltage (Vout) to the secondary winding.

* * * * *